US010762228B2

(12) United States Patent
Liu et al.

(10) Patent No.: US 10,762,228 B2
(45) Date of Patent: Sep. 1, 2020

(54) TRANSACTION SCHEDULING METHOD AND APPARATUS

(71) Applicant: Alibaba Group Holding Limited, George Town (KY)

(72) Inventors: Qi Liu, Hangzhou (CN); Ying Yan, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/788,247

(22) Filed: Feb. 11, 2020

(65) Prior Publication Data

US 2020/0184093 A1 Jun. 11, 2020

Related U.S. Application Data

(63) Continuation of application No. PCT/CN2020/072214, filed on Jan. 15, 2020.

(30) Foreign Application Priority Data

Aug. 30, 2019 (CN) .......................... 2019 1 0812684

(51) Int. Cl.
*G06F 21/62* (2013.01)
*G06F 16/2455* (2019.01)
*H04L 9/06* (2006.01)

(52) U.S. Cl.
CPC .... *G06F 21/6218* (2013.01); *G06F 16/24552* (2019.01); *H04L 9/0637* (2013.01); *H04L 2209/38* (2013.01)

(58) Field of Classification Search
CPC ........... G06F 21/6218; G06F 16/24552; H04L 9/0637; H04L 2209/38
See application file for complete search history.

(56) References Cited

U.S. PATENT DOCUMENTS

| 10,536,445 B1* | 1/2020 | Lerner .................... G06F 21/64 |
| 2018/0109516 A1* | 4/2018 | Song ..................... H04L 9/3263 |

(Continued)

FOREIGN PATENT DOCUMENTS

| CN | 107342858 | 11/2017 |
| CN | 109636599 | 4/2019 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Techane Gergiso
(74) *Attorney, Agent, or Firm* — Fish & Richardson P.C.

(57) ABSTRACT

Implementations of this specification provide a method and apparatus for transaction scheduling in a blockchain. An example method performed by a node in the blockchain includes receiving a first privacy transaction, and determining a data volume of the first privacy transaction; determining a first summation value by adding the data volume of the first privacy transaction to a data volume of all privacy transactions in a buffer queue, and adding the first privacy transaction to the buffer queue; receiving a second privacy transaction, and determining a data volume of the second privacy transaction; determining a second summation value by adding the data volume of the second privacy transaction to a data volume of all privacy transactions in the buffer queue, and packaging all privacy transactions in the buffer queue and transferring the packaged privacy transactions into a trusted environment; and adding the second privacy transaction to the buffer queue.

20 Claims, 7 Drawing Sheets

(56) References Cited

U.S. PATENT DOCUMENTS

| | | | |
|---|---|---|---|
| 2018/0373776 A1 | 12/2018 | Madisetti et al. | |
| 2019/0013933 A1* | 1/2019 | Mercuri | G06F 16/212 |
| 2019/0171849 A1* | 6/2019 | Assenmacher | H04L 69/04 |
| 2019/0251187 A1 | 8/2019 | Lin | |
| 2019/0288850 A1* | 9/2019 | Beecham | G06F 21/6227 |
| 2019/0311337 A1* | 10/2019 | Madisetti | G06Q 20/3825 |
| 2019/0340269 A1* | 11/2019 | Biernat | G06F 16/248 |

FOREIGN PATENT DOCUMENTS

| | | |
|---|---|---|
| CN | 109684408 | 4/2019 |
| CN | 109886682 | 6/2019 |
| CN | 110032876 | 7/2019 |
| CN | 110147684 | 8/2019 |
| CN | 110598416 | 12/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/072214, dated May 26, 2020, 21 pages (with machine translation).

* cited by examiner

TRANSACTION SCHEDULING METHOD AND APPARATUS

CROSS-REFERENCE TO RELATED APPLICATIONS

This application is a continuation of PCT Application No. PCT/CN2020/072214, filed on Jan. 15, 2020, which claims priority to Chinese Patent Application No. 201910812684.8, filed on Aug. 30, 2019, and each application is hereby incorporated by reference in its entirety.

TECHNICAL FIELD

One or more embodiments of the present disclosure relate to the field of blockchain technologies, and in particular, to a transaction scheduling method and apparatus.

BACKGROUND

A blockchain technology is constructed over a transmission network (for example, a point-to-point network). A network node on the transmission network verifies and stores data by using a chained data structure, and generates and updates data by using a distributed node consensus algorithm.

Currently, the two biggest technical challenges confronted by an enterprise-class blockchain platform lie in privacy and performance, and the two challenges are usually hard to address at the same time. Most solutions achieve privacy through a loss of performance, or do not consider privacy in the pursuit of performance. Common encryption technologies for reducing privacy issues, for example, homomorphic encryption and zero-knowledge proof, have high complexity and poor commonality, and may cause serious performance losses.

The trusted execution environment (TEE) is another solution to privacy issues. The TEE can play a role of a black box in hardware, and an operating system layer cannot peep at code or data executed in the TEE. An operation can be performed on the TEE by using an interface pre-defined in code. In terms of efficiency, due to the TEE's blackbox nature, a plaintext data operation is performed in the TEE, instead of a complex cryptographic operation in homomorphic encryption, and no efficiency loss occurs in a computing process. Therefore, in combination of the TEE, security and privacy of a blockchain can be greatly improved under the premise of a small performance loss. At present, the industry pays great attention to TEE solutions, and almost all mainstream chips and software alliances have their own TEE solutions, including trusted platform module (TPM) for software, and Intel Software Guard Extensions (SGX), ARM TrustZone, and AMD Platform Security Processor (PSP) for hardware.

SUMMARY

In view of this, one or more embodiments of the present disclosure provide a transaction scheduling method and apparatus.

To achieve the previous objective, one or more embodiments of the present disclosure provide the following technical solutions:

According to a first aspect of one or more embodiments of the present disclosure, a transaction scheduling method is proposed, including: determining, by a blockchain node, a data volume of a received privacy transaction; and packaging, by the blockchain node through a single function call, multiple privacy transactions for transfer into a trusted execution environment, wherein a sum of data volumes of the multiple privacy transactions is not greater than a predetermined threshold; wherein when a transfer-in data volume is not greater than the predetermined threshold, a first amount of overheads caused by the single function call is irrelevant to the transfer-in data volume; and when the transfer-in data volume is greater than the predetermined threshold, a second amount of overheads caused by the single function call is greater than the first amount of overheads and is positively correlated to the transfer-in data volume.

According to a second aspect of one or more embodiments of the present disclosure, a transaction scheduling apparatus is proposed, including: a determining unit, configured to enable a blockchain node to determine a data volume of a received privacy transaction; and a transmission unit, configured to enable the blockchain node to package, through a single function call, multiple privacy transactions for transfer into a trusted execution environment, wherein a sum of data volumes of the multiple privacy transactions is not greater than a predetermined threshold; wherein when a transfer-in data volume is not greater than the predetermined threshold, a first amount of overheads caused by the single function call is irrelevant to the transfer-in data volume; and when the transfer-in data volume is greater than the predetermined threshold, a second amount of overheads caused by the single function call is greater than the first amount of overheads and is positively correlated to the transfer-in data volume.

According to a third aspect of one or more embodiments of the present disclosure, an electronic device is proposed, including: a processor; and a memory, configured to store an instruction executable by the processor, wherein the processor runs the executable instruction to implement the method according to the first aspect.

According to a fourth aspect of one or more embodiments of the present disclosure, a computer-readable storage medium is proposed, wherein the computer-readable storage medium stores a computer instruction, and when the instruction is executed by a processor, steps of the method according to the first aspect are implemented.

DESCRIPTION OF EMBODIMENTS

Embodiments are described in detail here, and examples of the embodiments are presented in the accompanying drawings. When the following description relates to the accompanying drawings, unless specified otherwise, same numbers in different accompanying drawings represent same or similar elements. Embodiments described in the following do not represent all embodiments consistent with one or more embodiments of the present disclosure. On the contrary, the embodiments are examples of apparatuses and methods that are described in the appended claims in detail and consistent with some aspects of one or more embodiments of the present disclosure.

Notably, steps of a corresponding method in another embodiment are not necessarily performed in a sequence shown and described in the present disclosure. In some other embodiments, the method thereof may include more or fewer steps than those described in the present disclosure. In addition, a single step described in the present disclosure may be divided into multiple steps for description in other embodiments, and multiple steps described in the present disclosure may be combined into a single step for description in other embodiments.

Blockchains are generally classified into three types: public blockchains, private blockchains, and consortium blockchains. In addition, there are combinations of multiple types, for example, different combinations such as private blockchain+consortium blockchain and consortium blockchain+public blockchain. Public blockchains are the most decentralized. Applications of public blockchains include bitcoin and Ethereum. Participants of a public blockchain can read data records on the chain, participate in transactions, and compete for accounting rights of new blocks, etc. Moreover, each participant (namely, node) can freely join or exit a network, and perform a related operation. On the contrary, for a private blockchain, a write permission of the network is controlled by a certain organization or institution, and a data read permission is specified by the organization. Simply speaking, the private blockchain can be a weak centralized system, and has few participant nodes, which are strictly limited. This type of blockchain is more suitable for internal use in a specific institution. A consortium blockchain is a blockchain between a public blockchain and a private blockchain, and can implement "partial decentralization". Each node in the consortium blockchain usually corresponds to an entity institution or organization. Participants join a network after being authorized and form an interest-related consortium to jointly maintain running of the blockchain.

Figure 1:
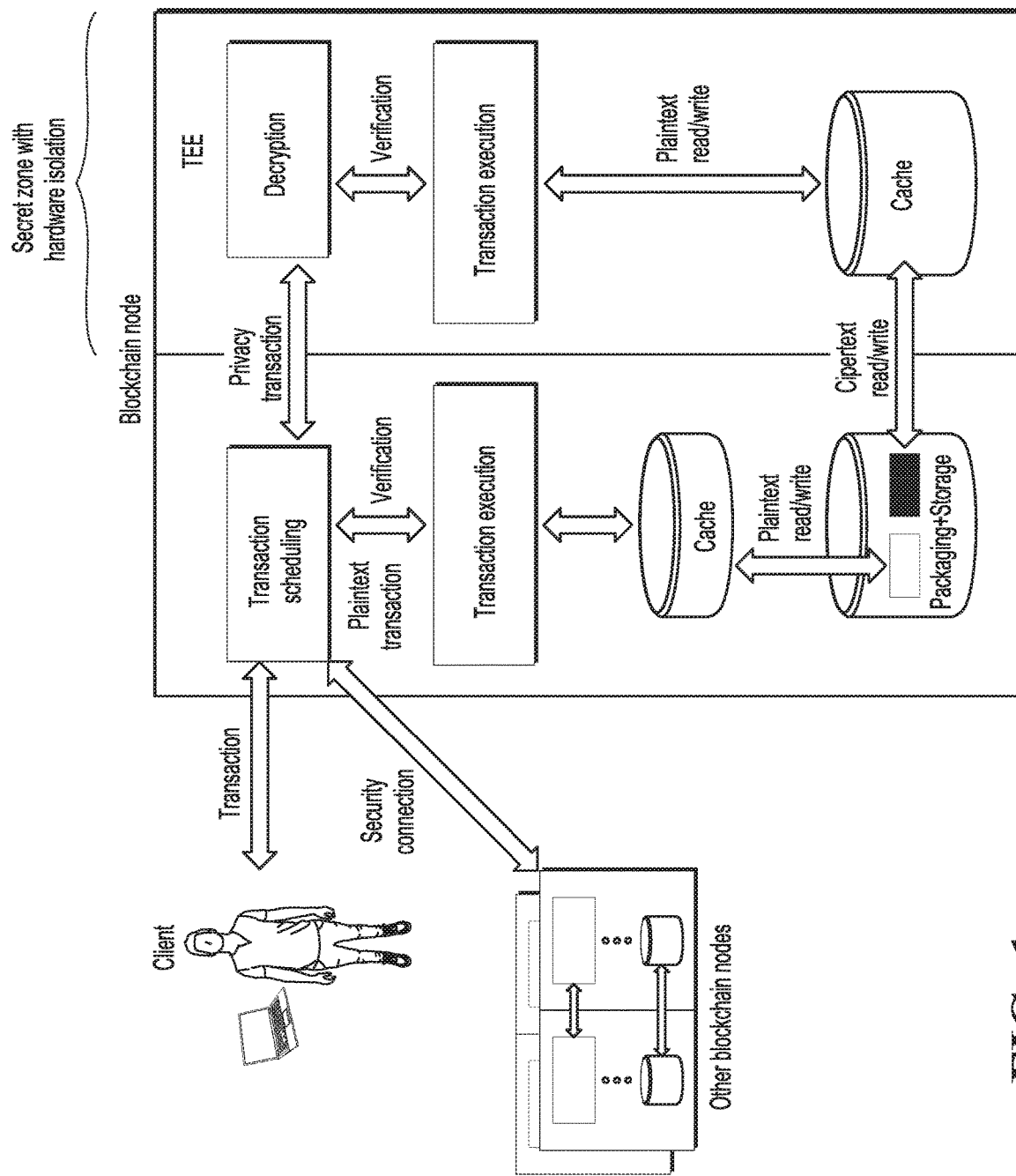
FIG. 1 is a schematic diagram illustrating transaction processing performed by a blockchain node, according to an embodiment of the present disclosure.

For a purpose of privacy protection, nodes in a blockchain network each may execute a received transaction in a trusted execution environment (TEE) by using a solution combining a blockchain and the TEE, regardless of a public blockchain, a private blockchain, or a consortium blockchain. As shown in FIG. 1, a blockchain node includes a conventional execution environment on the left and a TEE on the right. A transaction submitted by a client (or another source) first enters a "transaction scheduling" interface of the conventional execution environment for type identification. An identified plaintext transaction is retained in the conventional execution environment for processing (corresponding to a "transaction execution" step on the left), and an identified privacy transaction is transferred to the TEE for processing (corresponding to a "transaction execution" step on the right).

The TEE is a security extension based on CPU hardware, and is a trusted execution environment isolated from the outside. TEE is a concept originally proposed by Global Platform, which is used to address security isolation of resources on mobile devices, and provides a trusted and secure execution environment for applications in parallel with an operating system. ARM's Trust Zone technology was the first to implement a truly commercial TEE technology. With rapid development of the Internet, security requirements become increasingly higher. Not only mobile devices, the cloud devices, and the data centers raise more demands on the TEE. The concept of the TEE has also been rapidly developed and expanded. The TEE now is broader than the original concept. For example, server chip manufacturers Intel and AMD have successively launched hardware-assisted TEEs, which enrich the concept and features of the TEE and are widely recognized in the industry. The TEE mentioned now usually refers more to this type of hardware-assisted TEE technology. Unlike mobile ends, cloud ends need to be accessed remotely, and a hardware platform is invisible to terminal users. Therefore, the first step in using the TEE is to confirm authenticity and trustiness of the TEE. Therefore, current TEE technologies all introduce a remote attestation mechanism. Endorsement by hardware manufacturers (mainly CPU manufacturers) and a digital signature technology are used to ensure that users can verify a TEE status. In addition, secure resource isolation alone may not meet the security requirements, and data privacy protection is further proposed. Commercial TEEs including Intel SGX and AMD SEV each provide a memory encryption technology, so that trusted hardware is limited to inside a CPU, and both bus and memory data is ciphertext to prevent snooping by malicious users. For example, TEE technologies such as Intel SGX isolate code execution, remote attestation, security configuration, secure storage of data, and trusted paths used for code execution. Applications running in the TEE are subject to security protection and can hardly be accessed by third parties.

In an example of the Intel SGX technology, SGX provides an enclave, namely, an encrypted trusted execution area in a memory, so that a CPU provides data protection against theft. For example, a first blockchain node adopts a CPU that supports SGX. In this case, a newly added processor instruction can be used to allocate a part of an area, namely, an enclave page cache (EPC) in a memory, and a memory encryption engine (MEE) inside the CPU can be used to encrypt data inside the EPC. Encrypted content in the EPC is decrypted into plaintext after entering the CPU. Therefore, in SGX, users can distrust an operating system, a virtual machine monitor (VMM), and even a basic input output system (BIOS). Nevertheless, the users can still ensure no leakage of privacy data, provided that they trust the CPU. In practice, privacy data can be encrypted and sent to an enclave in a form of ciphertext, and a corresponding key can also be transferred into the enclave through remote attestation. Subsequently, the data can be used for operations under encryption protection of the CPU, and a result is returned in a form of ciphertext. In such a mode, a powerful computing capability can be used without worrying about data leakage.

In related technologies, a blockchain node can implement a function call inside an enclave through an ECall operation, so as to transfer a privacy transaction from a conventional execution environment to a TEE. In this case, when the blockchain node frequently receives transactions, each transaction needs to be transferred to the TEE separately by using the ECall operation, and relatively high overheads may be caused, affecting transaction processing efficiency of the blockchain node.

The following describes a transaction scheduling method according to the present disclosure with reference to embodiments, which can relatively reduce overheads caused by transferring a privacy transaction.

Figure 2:
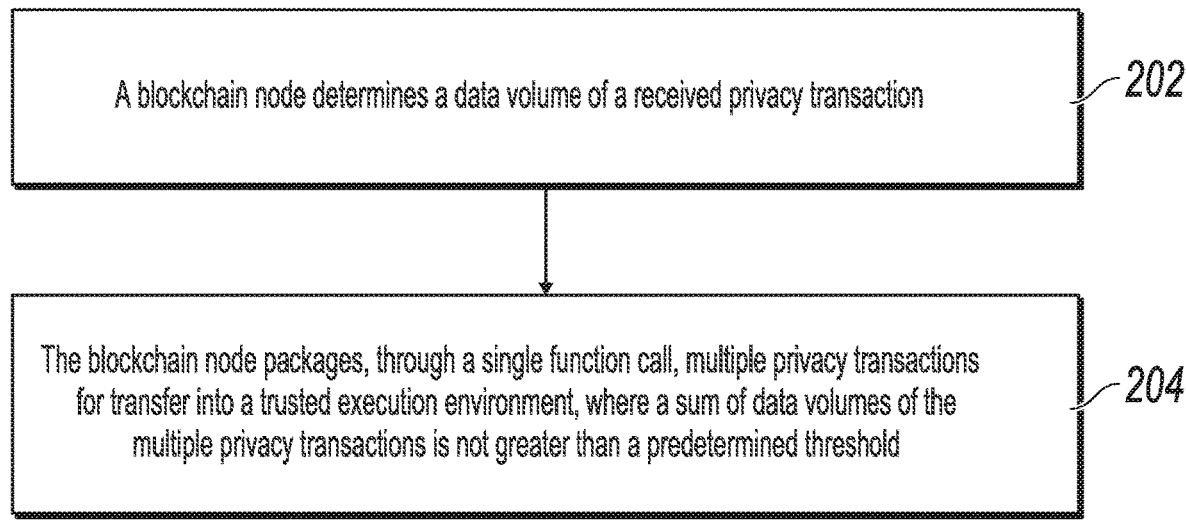
FIG. 2 is a flowchart illustrating a transaction scheduling method, according to an embodiment of the present disclosure.

FIG. 2 is a flowchart illustrating a transaction scheduling method, according to an embodiment of the present disclosure. As shown in FIG. 2, the method can include the following steps.

At step 202, a blockchain node determines a data volume of a received privacy transaction.

The privacy transaction can be understood as a transaction with a privacy requirement. In addition to the privacy transaction, the blockchain node may receive a plaintext transaction, which is a transaction with no privacy requirement. A privacy requirement can be expressed in multiple ways, and embodiments are not limited in the present application. For example, each transaction can include a type field, and the type field is used to label the corresponding transaction as a privacy transaction or a plaintext transaction. As described above, the blockchain node can identify a transaction type on the "transaction scheduling" interface of the conventional execution environment shown in FIG. 1. In related technologies, for example, in an Ethereum network, a transaction usually includes fields such as "to", "value", and "data". On the basis of the related technologies, in the present embodiment, a type field is added to the transaction, and a type of the related transaction is indicated based on a value of the type field. For example, when the type field is a first value, it indicates that the related transaction is a plaintext transaction, and when the type field is a second value, it indicates that the related transaction is a privacy transaction. For another example, a user can add an encryption identifier to a transaction when creating the transaction, to represent the foregoing privacy requirement. When identifying that a transaction includes an encryption identifier, a blockchain node can determine that the transaction is a privacy transaction, or otherwise determine that the transaction is a plaintext transaction. For another example, a blockchain node can identify a type of a smart contract that a transaction needs to invoke. When an invoked smart contract belongs to a privacy type (for example, the smart contract includes a privacy identifier, or code of the smart contract includes a contract status labeled by a privacy identifier, etc.), the blockchain node can determine that the transaction is a privacy transaction, or otherwise determine that the transaction is a plaintext transaction.

The blockchain node can receive the transaction from a client. For example, after generating the transaction on the client, a user can submit the transaction to the blockchain node through the client. Or, the transaction can be forwarded by another blockchain node to the preceding blockchain node. For example, after generating the transaction on a client, a user can submit the transaction to the another blockchain node through the client, so that the another blockchain node forwards the transaction to the preceding blockchain node. Or, a user can directly generate the transaction on the blockchain node.

For example, in a blockchain network that uses a consensus algorithm such as Proof of Work (POW), Proof of Stake (POS), or Delegated Proof of Stake (DPOS), each blockchain node immediately spreads (for example, broadcasts) the transaction to the rest of the blockchain nodes on the Ethereum network after receiving the transaction submitted by the client. Therefore, the transaction received by the blockchain node can include a transaction spread on the blockchain network by another blockchain node.

For example, on a blockchain network that uses a mechanism such as Practical Byzantine Fault Tolerance (PBFT), an account node is determined through negotiation before a current accounting process. In an example, the blockchain node may be determined as the accounting node. In this case, when receiving the transaction submitted by a client, another blockchain node can send the transaction to the determined accounting node as the another blockchain node is not the accounting node. As such, at a further consensus stage, the accounting node can package a transaction (including the transaction) for sending to each verification node. When another blockchain node other than the blockchain node is determined as the accounting node, the rest of the blockchain nodes can forward the transaction to the another blockchain node after receiving the transaction submitted by a client. Then, the another blockchain node can package the transaction (which may further include another transaction) at a consensus stage for sending to each verification node. When the blockchain node is a verification node, the blockchain node can receive the transaction forwarded by the another blockchain node.

A data volume of a privacy transaction can be understood as a size of the privacy transaction, that is, a memory size that the privacy transaction can occupy, for example, 5 bytes or any other size, which depends on content contained by the privacy transaction. Similarly, a plaintext transaction also corresponds to a data volume. However, as the plaintext transaction can be directly processed in a conventional execution environment of a blockchain node and does not need to be transferred to a TEE through a function call, the data volume of the plaintext transaction is not concerned in the present embodiment.

At step 204, the blockchain node packages, through a single function call, multiple privacy transactions for transfer into a trusted execution environment, wherein a sum of data volumes of the multiple privacy transactions is not greater than a predetermined threshold.

The blockchain node transfers the privacy transactions into the TEE through a function call, for example, implements the function call by using the previous ECall operation. In related technologies, a blockchain node transfers one privacy transaction into a TEE each time the blockchain node executes a function call. However, in the present embodiment, by executing one function call, namely, the previous single function call, the blockchain node can package multiple privacy transactions for transfer into the TEE, thereby reducing a quantity of function calls that need to be executed.

An experiment is performed to test a process that the blockchain node transfers the privacy transactions into the TEE through the function call, and a relationship between a transfer-in data volume and overheads is found in the present disclosure. When a transfer-in data volume is not greater than the predetermined threshold, a first amount of overheads caused by the single function call is irrelevant to the transfer-in data volume. When the transfer-in data volume is greater than the predetermined threshold, a second amount of overheads caused by the single function call is greater than the first amount of overheads and is positively correlated to the transfer-in data volume. Therefore, in the present disclosure, the multiple privacy transactions are packaged for transfer into the TEE through the single function call, and it is ensured that the transfer-in data volume (the sum of the data volumes of the multiple privacy transactions) is not greater than the predetermined threshold. As such, an amount of overheads of the single function call is the first amount of overheads. In one example, a quantity of the privacy transactions is N, the amount of overheads of the single function call is the first amount of overheads S. In this example, when the N privacy transactions are transferred into the TEE through N function calls, an amount of caused overheads is S×N. In other words, S×(N−1) overheads are saved according to the technical solution in the present disclosure. In at least some embodiments, the predetermined threshold can be not greater than a size of pre-allocated space of an EPC on the blockchain node. Therefore, a value of the predetermined threshold can be determined based on the size of the pre-allocated space of the EPC. Certainly, the value of the predetermined threshold can be determined through an actual test, and the value may be irrelevant or relevant to the pre-allocated space of the EPC, and embodiments are not limited in the present disclosure.

When the transfer-in data volume is not greater than the predetermined threshold and the transfer-in data volume is changed, a value of the first amount of overheads remains unchanged (for a case that the change is small, for example, is less than or far less than a change of the second amount of overheads, where the change of the first amount of overheads is an occasional irregular change).

The blockchain node can use a buffer mechanism to manage received privacy transactions to form a buffer queue composed of privacy transactions. These privacy transactions can be arranged in the buffer queue in chronological order of receiving moments, waiting to be transferred into the TEE by the blockchain node through the function call. After receiving any privacy transaction, the blockchain node can add a data volume of the any privacy transaction to a data volume of all privacy transactions in the buffer queue, and compare an obtained summation value with the predetermined threshold. When the summation value is not greater than the predetermined threshold, it indicates that a greater transfer-in data volume is bearable by the single function call, and therefore the blockchain node can add the any privacy transaction to the buffer queue, and wait to package the any privacy transaction together with subsequently received privacy transactions for transfer into the TEE. When a summation value is greater than the predetermined threshold, it indicates that not all privacy transactions that are received by the blockchain node and have not been transferred into the TEE (that is, all the privacy transactions in the buffer queue and the any privacy transaction recently received) can be transferred into the TEE through the single function call. However, as described above, it can be determined that the single function call is capable of bearing all the privacy transactions in the buffer queue. Therefore, the blockchain node can package all the privacy transactions in the buffer queue for transfer into the TEE, so that the buffer queue can be cleared and the any privacy transaction can be added to the cleared buffer queue. Then, the any privacy transaction serves as a first privacy transaction in the buffer queue and waits to be packaged together with subsequently received privacy transactions for transfer into the TEE.

Through the method above, the blockchain node can transfer as many privacy transactions as possible into the TEE each time it implements a single function call, thereby minimizing overheads caused by the single function call on the blockchain node. However, in some cases, the overheads of the blockchain node may not always reach the above-mentioned optimal situation. For example, when the data volume of the any privacy transaction received by the blockchain node exceeds the predetermined threshold, the blockchain node may separately transfer the any privacy transaction into the TEE through a single function call. An amount of overheads caused in this case, that is, the second amount of overheads cannot be maintained at the first amount of overhead. If the buffer queue further contains other privacy transactions when receiving the any privacy transaction, as described above, the blockchain node may execute a single function call to transfer all the privacy transactions in the buffer queue into the TEE, regardless of the number of privacy transactions in the buffer queue and a difference between the sum of the data volumes and the predetermined threshold. For another example, the blockchain node can record a waiting duration of a first privacy transaction in the buffer queue (the waiting duration can be calculated from a moment when the first privacy transaction is received or is added to the buffer queue), and when the waiting duration reaches a predetermined duration, package all the privacy transactions in the buffer queue for transfer into the TEE. Such practice can reduce delay of processing of the first privacy transaction due to excessively long waiting duration caused by generally small data volumes of privacy transactions or a low generation frequency of privacy transactions, etc. For still another example, the blockchain node may alternate received privacy transactions and plaintext transactions. Therefore, when receiving a plaintext transaction, the blockchain node can immediately package all the privacy transactions in the buffer queue for transfer into the TEE, and the blockchain node can execute the received plaintext transaction outside the TEE, so that all transactions can be sequentially executed in order to reduce confusion.

When creating a privacy transaction, a transaction initiator can encrypt transaction content of the privacy transaction. As such, even if the privacy transaction is included in a block to which it belongs and the block is added to a blockchain that can be publicly queried, an irrelevant user can only obtain encrypted transaction content and cannot learn plaintext transaction content. The blockchain node can decrypt the privacy transaction in the TEE to obtain the plaintext transaction content, and then execute the plaintext transaction content in the TEE.

The transaction initiator can hold a symmetric encryption key, and encrypt the transaction content based on the key by using a symmetric encryption method, so that the privacy transaction contains encrypted ciphertext transaction content. Accordingly, the blockchain node can store the symmetric encryption key in the TEE, and perform decryption based on the key by using the symmetric encryption method to obtain the plaintext transaction content.

Or, the transaction initiator can hold an asymmetric encryption public key, and encrypt the transaction content based on the public key by using an asymmetric encryption method, so that the privacy transaction contains encrypted ciphertext transaction content. Accordingly, the blockchain node can store an asymmetric encryption private key in the TEE, and perform decryption based on the private key by using the asymmetric encryption method to obtain the plaintext transaction content.

The transaction initiator can hold a symmetric encryption key and an asymmetric encryption public key, encrypt the transaction content based on the symmetric encryption key by using a symmetric encryption method, and further encrypt the symmetric encryption key based on the asymmetric encryption public key by using an asymmetric encryption method, so that the privacy transaction contains encrypted ciphertext transaction content and an encrypted key. Accordingly, the blockchain node can store an asymmetric encryption private key in the TEE, decrypt the encrypted key based on the private key by using the asymmetric encryption method to obtain the symmetric encryption key, and further decrypt the ciphertext transaction content based on the symmetric encryption key by using the symmetric encryption method to obtain the plaintext transaction content. The encryption method used in the preceding process is digital envelope encryption.

After decrypting the encrypted privacy transaction in the TEE to obtain and execute the transaction content, the blockchain node can encrypt a transaction execution result in the TEE, and then provide an encrypted transaction execution result to the transaction initiator. In addition, the transaction initiator is capable of decrypting the encrypted transaction execution result. For example, the blockchain node can encrypt the transaction execution result in the TEE by using the symmetric encryption key above, and a client of the transaction initiator can perform decryption accordingly. For another example, the blockchain node can encrypt the transaction execution result in the TEE by using the asymmetric encryption public key, and a client of the transaction initiator can perform decryption by using the corresponding asymmetric encryption private key. For still another example, the blockchain node can encrypt the transaction execution result in the TEE by using the symmetric encryption key, and encrypt the symmetric encryption key by using the asymmetric encryption public key, and a client of the transaction initiator can perform decryption by using the corresponding asymmetrically encryption private key to obtain the symmetric encryption key, and further decrypt the transaction execution result based on the symmetric encryption key.

The symmetric encryption key and the asymmetric encryption public and private keys that are used in the preceding encryption and decryption processes can be determined through negotiation between the client of the transaction initiator and the blockchain node, or can be delivered by a key management service (KMS) server to the client of the transaction initiator and the blockchain node after the TEE on the blockchain node succeeds in remote attestation. A symmetric encryption algorithm can be, for example, the Data Encryption Standard (DES) algorithm, the 3DES algorithm, the Triple Data Encryption Algorithm (TDEA) algorithm, the Blowfish algorithm, the RCS algorithm, or the International Data Encryption Algorithm (IDEA) algorithm, etc. An asymmetric encryption algorithm can be, for example, Rivest-Shamir-Adleman (RSA), Elgamal, the knapsack algorithm, Rabin, D-H (Diffie-Hellman key exchange), or the elliptic curve cryptography (ECC) algorithm, etc.

A transaction in the present disclosure can be used to implement relatively simple processing logic, which is, for example, similar to transfer logic in related technologies. In this case, the preceding plaintext transaction or privacy transaction can both be irrelevant to a smart contract.

A transaction in the present disclosure can also be used to implement relatively complex processing logic with help of the preceding smart contract. For example, Ethereum allows users to create and/or call some complex logic in an Ethereum network, which is the biggest challenge that differentiates Ethereum from the bitcoin blockchain technology. The core of Ethereum as a programmable blockchain lies in the Ethereum virtual machine (EVM), and each Ethereum node can run EVMs. An EVM is a Turing complete virtual machine, which means that a variety of complex logic can be implemented through the EVM. Users can issue and call smart contracts in Ethereum over EVMs. As shown in FIG. 1, a smart contract issued or called by a plaintext transaction can be executed through an EVM by deploying the EVM in a conventional execution environment, so as to implement a "transaction execution" step in the conventional execution environment. In addition, a smart contract issued or called by a privacy transaction can be executed through an EVM by deploying the EVM in a TEE, so as to implement a "transaction execution" step in the TEE.

Figure 3:
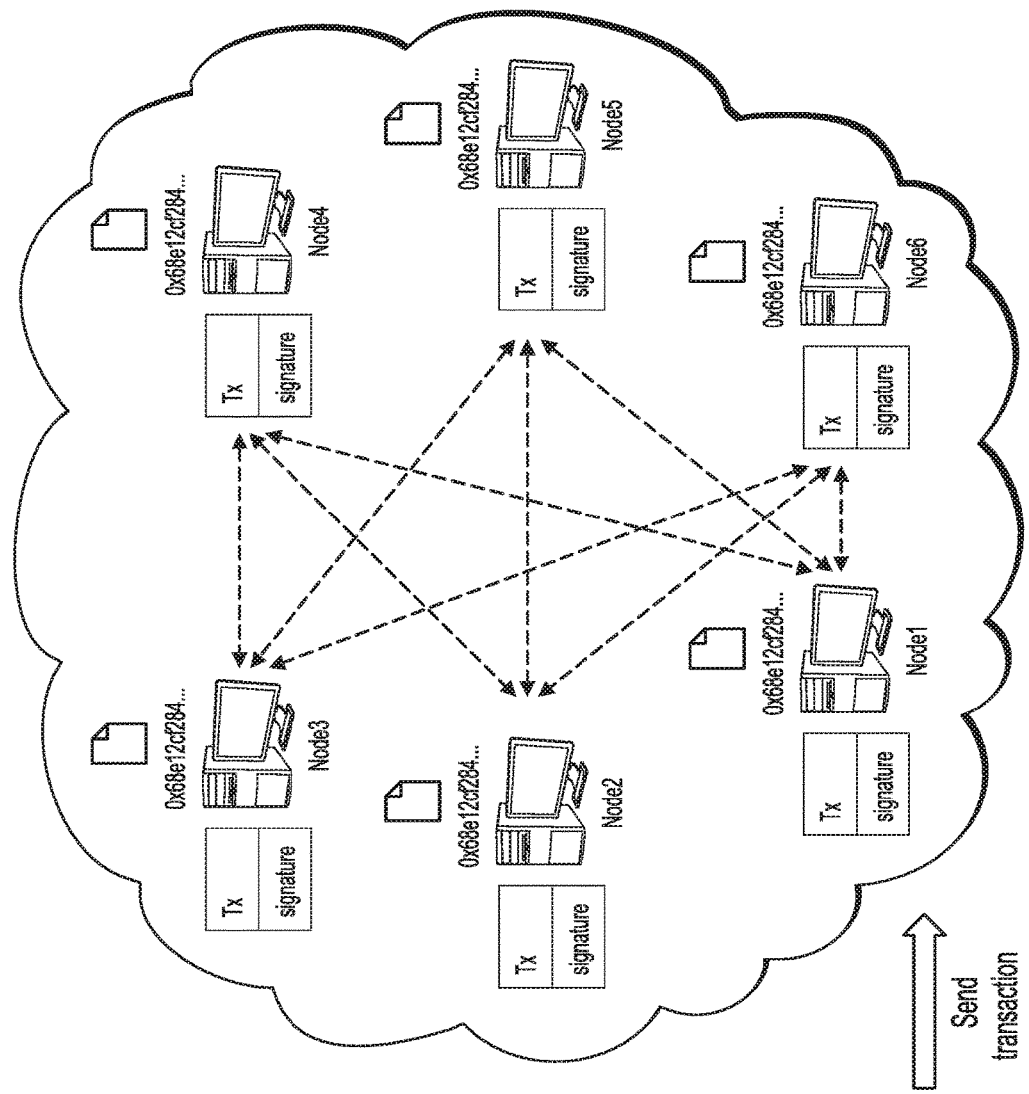
FIG. 3 is a schematic diagram illustrating smart contract creation, according to an embodiment of the present disclosure.
Figure 3:
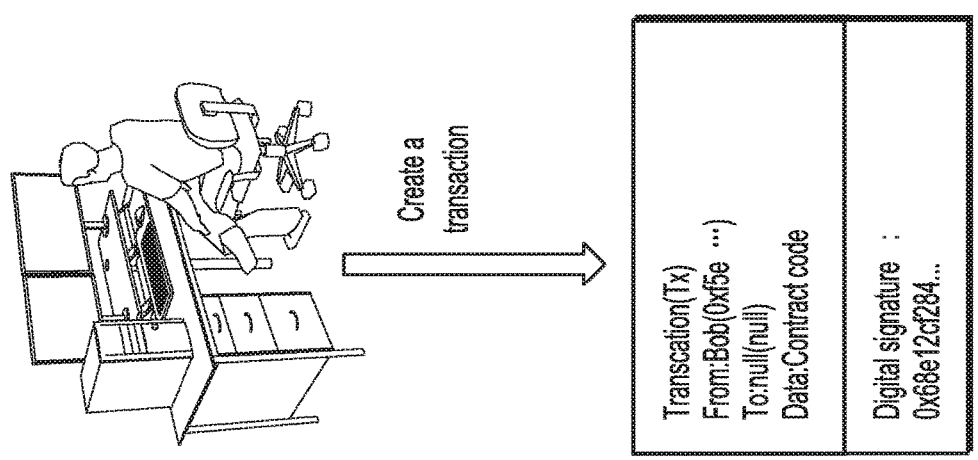

For example, as shown in FIG. 3, after Bob sends a transaction containing smart contract creation information to an Ethereum network, an EVM of node 1 can execute the transaction and generate a corresponding contract instance. A data field of the transaction can store code (for example, bytecode) of the smart contract, and a "to" field of the transaction is a null account. The contract is successfully created after the nodes reach a consensus through a consensus mechanism, and users can call the contract subsequently. After the contract is created, a contract account corresponding to the smart contract appears on the blockchain and has a specific address. The contract code and an account storage are stored in the contract account. Behavior of the smart contract is controlled by the contract code, while the account storage of the smart contract stores a status of the contract. In other words, the smart contract enables a virtual account containing the contract code and the account storage to be generated on the blockchain.

Figure 4:
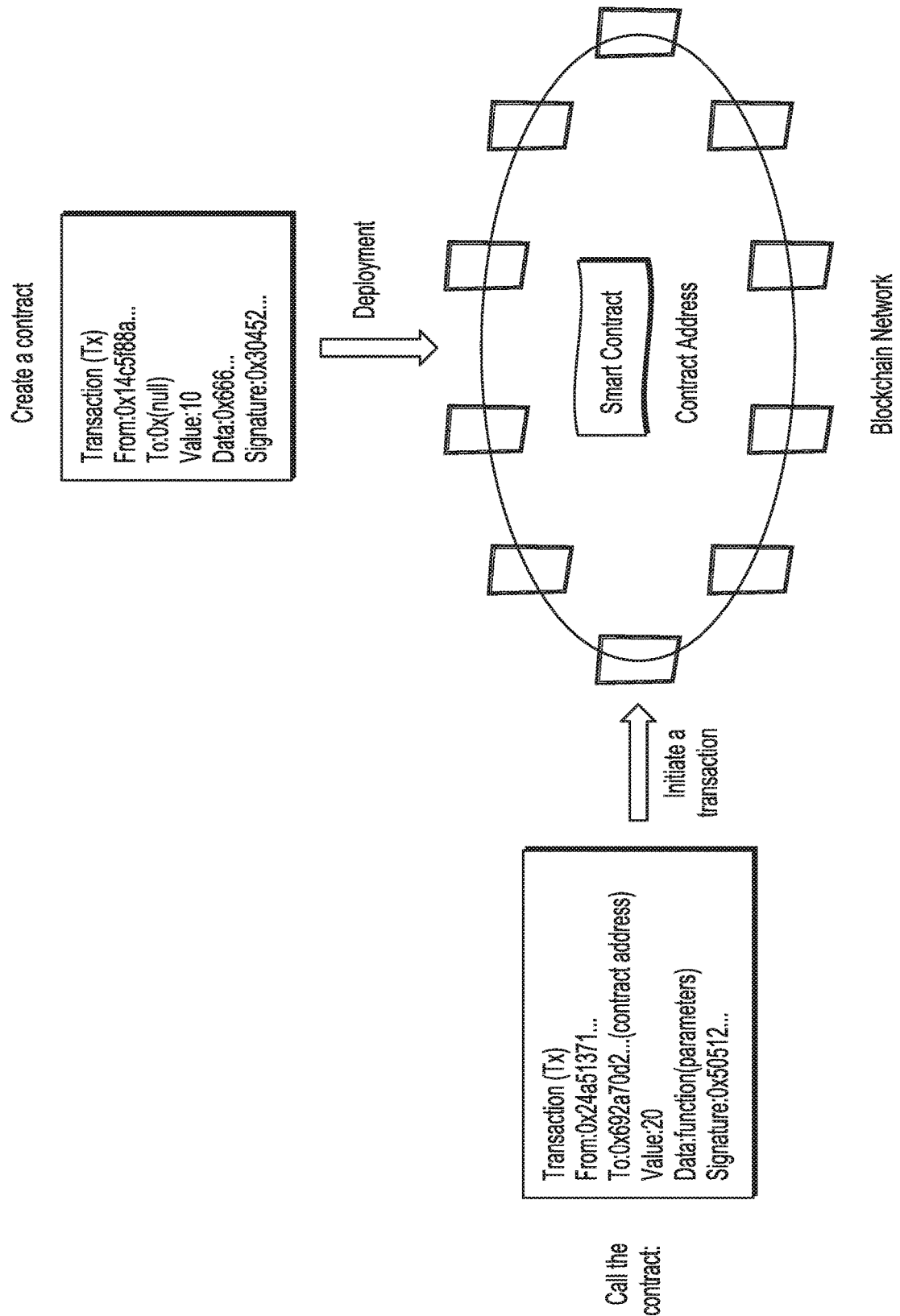
FIG. 4 is a schematic diagram illustrating smart contract scheduling, according to an embodiment of the present disclosure.

Further, as shown in FIG. 4, still using Ethereum as an example, after Bob sends a transaction calling a smart contract to an Ethereum network, an EVM of node 1 can execute the transaction and generate a corresponding contract instance. In FIG. 4, a "from" field of the transaction indicates an address of an account that initiates the call to the smart contract, "0x692a70d2 . . . " in a "to" field indicates an address of the called smart contract, a "value" field indicates a value of ETH in Ethereum, a "data" field of the transaction stores a method and a parameter for calling the smart contract. A value of a balance may change after the smart contract is called. Subsequently, a certain client can view a current value of the balance through a certain blockchain node. The smart contract can be independently executed on each node in the blockchain network in a designated method, and all execution records and data are stored on the blockchain. Therefore, when such a transaction is completed, the blockchain stores transaction credentials that cannot be tampered and do not get lost.

After the blockchain node decrypts the preceding privacy transaction in the TEE to obtain the plaintext transaction content, if the plaintext transaction content is related to a smart contract, for example, the plaintext transaction content is used to issue or call the smart contract, the smart contract can be referred to as an associated smart contract corresponding to the plaintext transaction content. If the plaintext transaction content is used to issue the associated smart contract, code of the associated smart contract is contained in the plaintext transaction content, for example, located in a "data" field of the plaintext transaction content. If the plaintext transaction content is used to call the associated smart contract, the code of the associated smart contract is located in a database maintained by the blockchain node. Correspondingly, the blockchain node can execute the associated smart contract corresponding to the plaintext transaction content in the TEE, that is, execute the code of the associated smart contract in an EVM deployed in the TEE, so as to issue or call the associated smart contract. A multi-nested structure can be implemented between smart contracts. For example, code in smart contract 1 calls smart contract 2, and code in smart contract 2 points to contract address 3 generated by smart contract creation code. As such, when calling the code in smart contract 1, a privacy transaction directly calls the code in smart contract 2 and indirectly calls smart contract code at contract address 3. Therefore, the code of smart contract 1, smart contract 2, and smart contract 3 is all executed in the EVM deployed in the TEE.

Similar to a contract status balance in the embodiment shown in FIG. 4, after the associated smart contract is executed by the EVM, one or more contract statuses may have their values changed. Correspondingly, the blockchain node can encrypt at least one contract status corresponding to the associated smart contract in the TEE, and write an obtained encrypted contract status into the database. The writing into the database generally refers to storage in a storage medium, which is more commonly a persistent storage medium. The persistent storage medium can be a magnetic disk, a floppy disk, or a memory that can recover data upon power-on for persistent storage.

The blockchain node can encrypt the contract status by using a symmetric encryption key to obtain the encrypted contract status described above. For example, after the TEE on the blockchain node succeeds in the remote certification, the preceding KMS server can deliver the symmetric encryption key to the blockchain node. Or, a key delivered by the KMS server can be used as a root key, and the blockchain node can derive the symmetric encryption key based on the root key. For another example, the symmetric encryption key can be obtained through negotiation between blockchain nodes in the blockchain network. Certainly, the blockchain node can encrypt the contract status by using the asymmetric encryption public key in addition to the symmetric encryption key, and the blockchain node holds the asymmetric encryption private key used for decrypting the encrypted contract status. The key used to encrypt the contract status can be stored in an enclave within the TEE on the blockchain node, so as to ensure security of the key.

Figure 5:
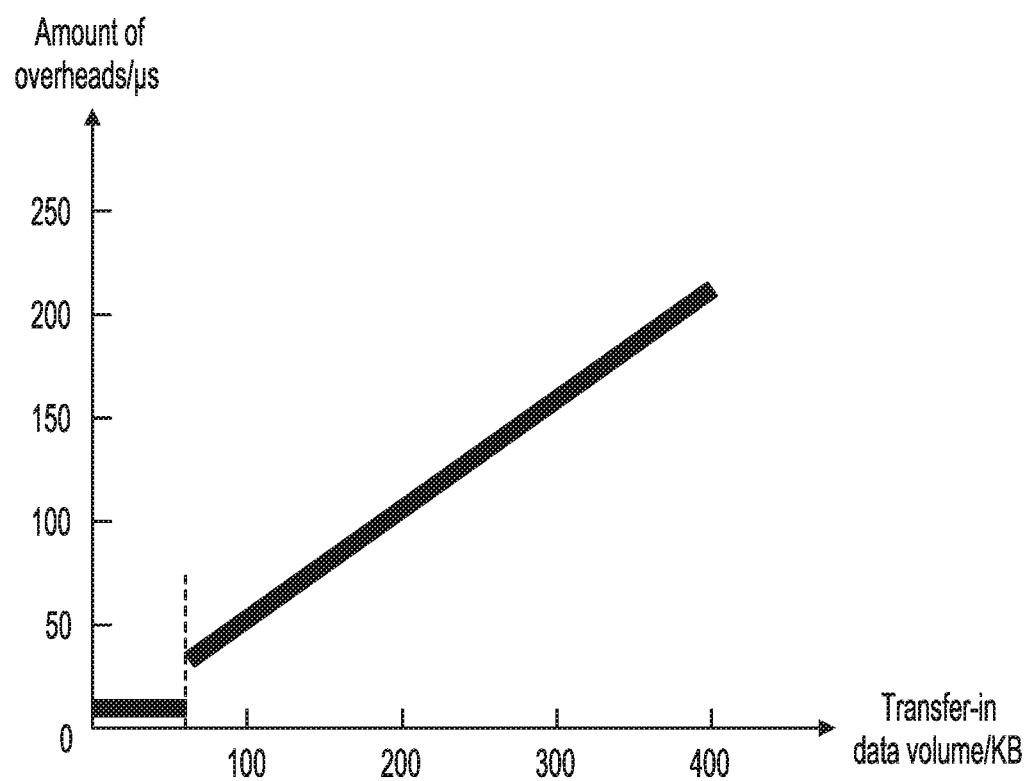
FIG. 5 is a schematic diagram illustrating a change relationship between a transfer-in data volume and an amount of overheads, according to an embodiment of the present disclosure.

FIG. 5 is a schematic diagram illustrating a change relationship between a transfer-in data volume and an amount of overheads, according to an embodiment. In one example, a change of the amount of overheads with the transfer-in data volume conforms to a function $y=f(x)$, where y is the amount of overheads and x is the transfer-in data volume for privacy transaction transfer into the TEE by the blockchain node through a single ECall operation. As shown in FIG. 5, the function $f(x)$ is a piecewise function. When the transfer-in data volume belongs to [0, 64 KB], a value of the amount y of overheads is basically maintained at about 10 µs. When the transfer-in data volume is greater than 64 KB, a value of the amount y of overheads basically presents a change pattern of linear increases.

Therefore, based on a value change pattern of the function $f(x)$, when transferring a privacy transaction into the TEE, the blockchain node can package as many privacy transactions as possible for transfer into the TEE through a single ECall operation. Compared to practice that one or few privacy transactions are transferred at a time, such practice can reduce ECall operations, thereby reducing overheads caused by transferring privacy transactions by the blockchain node.

Based on the function $f(x)$ shown in FIG. 5, the blockchain node provides multiple processing methods for one received transaction. A list of several possible cases are described below.

The blockchain node may receive one privacy transaction. The blockchain node can calculate a sum of data volumes of the privacy transaction and existing privacy transactions in a buffer queue. If the sum of the data volumes does not exceed 64 KB, the blockchain node adds the privacy transaction to the buffer queue and keeps waiting for other privacy transactions to be received, so that a sum of data volumes of privacy transactions to be transferred into the TEE in batches is as close to 64 KB as possible, and as many privacy transactions as possible (within a transfer-in data volume of 64 KB) can be transferred into TEE through a single ECall operation. If the sum of the data volumes exceeds 64 KB, the blockchain node can transfer all the original privacy transactions in the buffer queue into the TEE through a single ECall operation to clear the buffer queue, and add the privacy transaction most recently received to the cleared buffer queue.

The blockchain node may receive one plaintext transaction. To ensure sequential execution of all transactions, the blockchain node may not need to concern whether a sum of data volumes of existing privacy transactions in a buffer queue is close to a 64 KB limit, but immediately transfers all the privacy transactions in the buffer queue into the TEE through a single ECall operation and processes the recently received plaintext transaction in the conventional execution environment.

In addition, when a transaction frequency on the blockchain network is relatively low, a privacy transaction added by the blockchain node to the buffer queue may need to wait for a long time, so that privacy transactions have a transfer-in data volume close to 64 KB. Therefore, the blockchain node can record a receiving moment or an adding moment (a moment for being added to the buffer queue) of the first privacy transaction in the buffer queue. As such, after determining that a waiting duration of the first privacy transaction reaches a predetermined duration, regardless of whether the sum of the data volumes of all the privacy transactions in the buffer queue is close to the 64 KB limit, the blockchain node should immediately transfer all the privacy transactions in the buffer queue into the TEE through a single ECall operation to ensure timely transaction execution.

Figure 6:
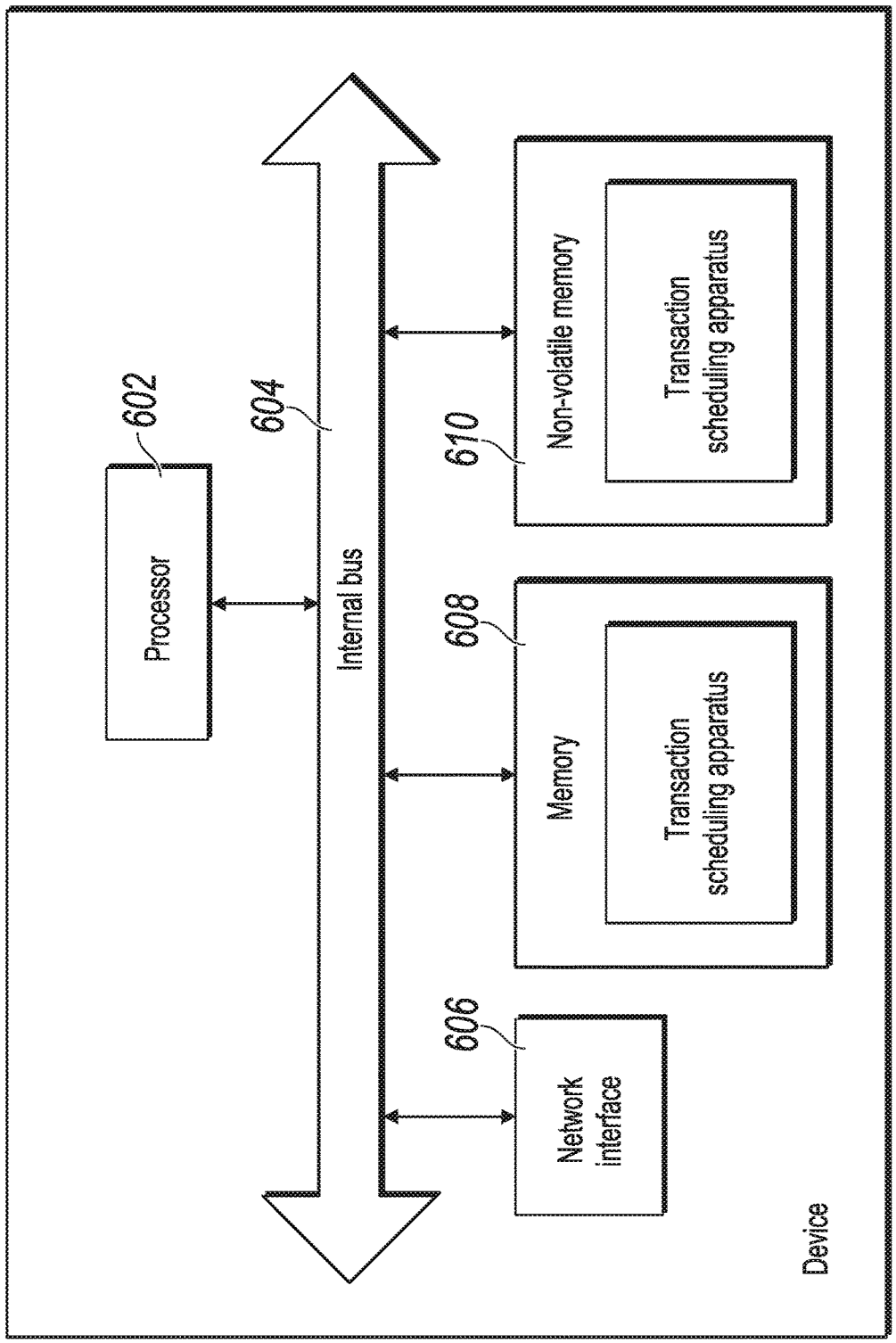
FIG. 6 is a schematic structural diagram illustrating a device, according to an embodiment of the present disclosure.

FIG. 6 is a schematic structural diagram illustrating a device, according to an embodiment. Referring to FIG. 6, in terms of hardware, the device includes a processor 602, an internal bus 604, a network interface 606, a memory 608, and a non-volatile memory 610, and certainly can further include hardware needed by other services. The processor 602 reads a corresponding computer program from the non-volatile memory 610 to the memory 608 for running, and a transaction scheduling apparatus is logically formed. Certainly, in addition to a software embodiment, one or more embodiments of the present application do not exclude another embodiment, for example, a logic device or a combination of hardware and software. That is, an execution body of the following processing procedure is not limited to each logical unit, and can also be hardware or a logic device.

Figure 7:
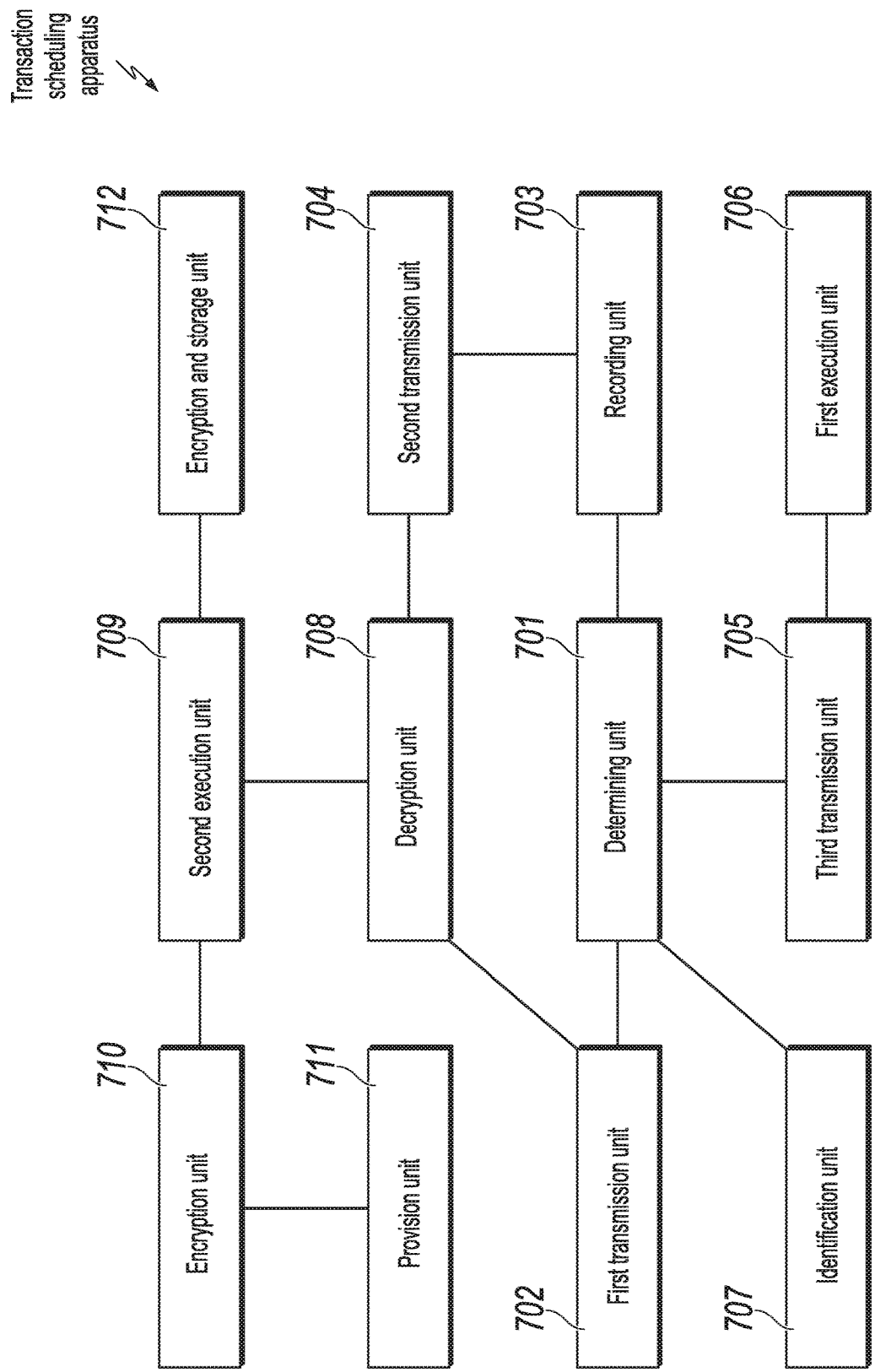
FIG. 7 is a block diagram illustrating a transaction scheduling apparatus, according to an embodiment of the present disclosure.

Referring FIG. 7, in a software embodiment, the transaction scheduling apparatus can include the following: a determining unit 701, configured to enable a blockchain node to determine a data volume of a received privacy transaction; and a first transmission unit 702, configured to enable the blockchain node to package, through a single function call, multiple privacy transactions for transfer into a trusted execution environment, wherein a sum of data volumes of the multiple privacy transactions is not greater than a predetermined threshold; wherein when a transfer-in data volume is not greater than the predetermined threshold, a first amount of overheads caused by the single function call is irrelevant to the transfer-in data volume; and when the transfer-in data volume is greater than the predetermined threshold, a second amount of overheads caused by the single function call is greater than the first amount of overheads and is positively correlated to the transfer-in data volume.

In some embodiments, the first transmission unit 702 is configured to: enable the blockchain node to add, after receiving any privacy transaction, a data volume of the any privacy transaction to a data volume of all privacy transactions in a buffer queue; and enable the blockchain node to add, when a summation value is not greater than the predetermined threshold, the any privacy transaction to the buffer queue; or enable the blockchain node to package, when a summation value is greater than the predetermined threshold, all the privacy transactions in the buffer queue for transfer into the trusted execution environment, and add the any privacy transaction to the cleared buffer queue.

In some embodiments, the transaction scheduling apparatus further includes the following: a recording unit 703, configured to enable the blockchain node to record a waiting duration of a first privacy transaction in a buffer queue; and a second transmission unit 704, when the waiting duration reaches a predetermined duration, configured to enable the blockchain node to package all privacy transactions in the buffer queue for transfer into the trusted execution environment.

In some embodiments, the transaction scheduling apparatus further includes the following: a third transmission unit 705, configured to enable the blockchain node to package, when receiving a plaintext transaction, all privacy transactions in a buffer queue for transfer into the trusted execution environment; and a first execution unit 706, configured to enable the blockchain node to execute the plaintext transaction outside the trusted execution environment.

In some embodiments, the transaction scheduling apparatus further includes the following: an identification unit 707, configured to enable the blockchain node to identify that a received transaction is a privacy transaction or a plaintext transaction based on a type field comprised in the transaction.

In some embodiments, when the transfer-in data volume is changed, a value of the first amount of overheads remains unchanged.

In some embodiments, the predetermined threshold is not greater than a size of pre-allocated space of an enclave page cache on the blockchain node.

In some embodiments, transaction content of the privacy transaction is encrypted by a transaction initiator, and the apparatus further includes the following: a decryption unit 708, configured to enable the blockchain node to decrypt the privacy transaction in the trusted execution environment to obtain plaintext transaction content; and a second execution unit 709, configured to enable the blockchain node to execute the plaintext transaction content in the trusted execution environment.

In some embodiments, the transaction scheduling apparatus further includes the following: an encryption unit 710, configured to enable the blockchain node to encrypt a transaction execution result in the trusted execution environment; and a delivery unit 711, configured to enable the blockchain node to send the encrypted transaction execution result to the transaction initiator, wherein the transaction initiator has a capability of decrypting the encrypted transaction execution result.

In some embodiments, the plaintext transaction content is related to a smart contract, and the second execution unit 709 is configured to enable the blockchain node to execute an associated smart contract corresponding to the plaintext transaction content in the trusted execution environment. The apparatus further comprises an encryption and storage unit 712, configured to enable the blockchain node to encrypt at least one contract status corresponding to the associated smart contract in the trusted execution environment, and write an obtained encrypted contract status into a database.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a configuration, a computer includes one or more processors (CPU), an input/output interface, a network interface, and a memory.

The memory may include a non-persistent memory, a random access memory (RAM), a non-volatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by a computing device. Based on the description in the present disclosure, the computer readable medium does not include transitory computer-readable media (transitory media), for example, a modulated data signal and carrier.

It is worthwhile to further note that the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

Some embodiments of the present disclosure are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some embodiments, multi-tasking and concurrent processing is feasible or can be advantageous.

Terms used in one or more embodiments of the present disclosure are not intended to limit the one or more embodiments of the present disclosure. The terms "a", "said" and "the" of singular forms used in one or more embodiments and the appended claims of the present disclosure are also intended to include plural forms, unless otherwise specified in the context clearly. It should also be understood that, the term "and/or" used here indicates and includes any or all possible combinations of one or more associated listed items.

It should be understood that although terms "first", "second", "third", etc. can be used in one or more embodiments of the present disclosure to describe various types of information, the information is not limited to these terms. These terms are used to differentiate between information of the same type. For example, without departing from the scope of one or more embodiments of the present disclosure, first information can also be referred to as second information, and similarly, the second information can be referred to as the first information. Depending on the context, for example, the word "if" used here can be explained as "while", "when", or "in response to determining".

The previous descriptions are examples of one or more embodiments of the present disclosure, but are not intended to limit the one or more embodiments of the present disclosure. Any modification, equivalent replacement, improvement, etc. made without departing from the spirit and principle of the one or more embodiments of the present disclosure shall fall within the protection scope of the one or more embodiments of the present disclosure.

What is claimed is:

1. A method comprising:
   receiving, by a blockchain node, a first privacy transaction, and determining, by the blockchain node, a first data volume of the first privacy transaction;
   determining, by the blockchain node, a first summation value by adding the first data volume of the first privacy transaction to a first data volume of all privacy transactions in a buffer queue;
   in response to determining, by the blockchain node, that the first summation value is not greater than a predetermined threshold, adding the first privacy transaction to the buffer queue;
   receiving, by the blockchain node, a second privacy transaction, and determining, by the blockchain node, a second data volume of the second privacy transaction;
   determining, by the blockchain node, a second summation value by adding the second data volume of the second privacy transaction to a second data volume of all privacy transactions in the buffer queue;
   in response to determining, by the blockchain node, that the second summation value is greater than the predetermined threshold, packaging, by the blockchain node, all privacy transactions in the buffer queue and transferring the packaged privacy transactions into a trusted environment; and
   adding the second privacy transaction to the buffer queue.

2. The method according claim 1, further comprising:
   recording, by the blockchain node, a waiting duration of a given privacy transaction, the given privacy transaction having been added first to the buffer queue; and
   in response to the waiting duration reaching a predetermined duration, packaging, by the blockchain node, all privacy transactions in the buffer queue for transfer into the trusted environment.

3. The method according to claim 1, further comprising:
   in response to receiving a plaintext transaction, packaging, by the blockchain node, all privacy transactions in the buffer queue for transfer into the trusted environment; and
   executing, by the blockchain node, the plaintext transaction outside of the trusted environment.

4. The method according to claim 1, further comprising:
   identifying, by the blockchain node, that a received transaction is a privacy transaction or a plaintext transaction based on a type field included in the received transaction.

5. The method according to claim 1, wherein the predetermined threshold is not greater than a size of pre-allocated space of an enclave page cache on the blockchain node.

6. The method according to claim 1, wherein transaction content of a given privacy transaction is encrypted by a transaction initiator, the method further comprising:
   decrypting, by the blockchain node, the given privacy transaction in the trusted environment to obtain plaintext transaction content; and
   executing, by the blockchain node, the plaintext transaction content in the trusted environment.

7. The method according to claim 6, further comprising:
   encrypting, by the blockchain node, a transaction execution result in the trusted environment; and
   sending, by the blockchain node, the encrypted transaction execution result to the transaction initiator, wherein the transaction initiator decrypts the encrypted transaction execution result.

8. The method according to claim 6, wherein the plaintext transaction content is related to a smart contract, and
   executing, by the blockchain node, the plaintext transaction content in the trusted environment comprises executing, by the blockchain node, the smart contract corresponding to the plaintext transaction content in the trusted environment, and the method further comprises:
   encrypting, by the blockchain node, at least one contract status corresponding to the smart contract in the trusted environment; and
   writing an obtained encrypted contract status into a database.

9. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations comprising:
   receiving, by a blockchain node, a first privacy transaction, and determining, by the blockchain node, a first data volume of the first privacy transaction;
   determining, by the blockchain node, a first summation value by adding the first data volume of the first privacy transaction to a first data volume of all privacy transactions in a buffer queue;
   in response to determining, by the blockchain node, that the first summation value is not greater than a predetermined threshold, adding the first privacy transaction to the buffer queue;

receiving, by the blockchain node, a second privacy transaction, and determining, by the blockchain node, a second data volume of the second privacy transaction;

determining, by the blockchain node, a second summation value by adding the second data volume of the second privacy transaction to a second data volume of all privacy transactions in the buffer queue;

in response to determining, by the blockchain node, that the second summation value is greater than the predetermined threshold, packaging, by the blockchain node, all privacy transactions in the buffer queue and transferring the packaged privacy transactions into a trusted environment; and adding the second privacy transaction to the buffer queue.

10. The system according claim 9, the operations further comprising:

recording, by the blockchain node, a waiting duration of a given privacy transaction, the given privacy transaction having been added first to the buffer queue; and in response to the waiting duration reaching a predetermined duration, packaging, by the blockchain node, all privacy transactions in the buffer queue for transfer into the trusted environment.

11. The system according to claim 9, the operations further comprising:

in response to receiving a plaintext transaction, packaging, by the blockchain node, all privacy transactions in the buffer queue for transfer into the trusted environment; and executing, by the blockchain node, the plaintext transaction outside of the trusted environment.

12. The system according to claim 9, the operations further comprising:

identifying, by the blockchain node, that a received transaction is a privacy transaction or a plaintext transaction based on a type field included in the received transaction.

13. The system according to claim 9, wherein the predetermined threshold is not greater than a size of pre-allocated space of an enclave page cache on the blockchain node.

14. The system according to claim 9, wherein transaction content of a given privacy transaction is encrypted by a transaction initiator, the operations further comprising:

decrypting, by the blockchain node, the given privacy transaction in the trusted environment to obtain plaintext transaction content; and executing, by the blockchain node, the plaintext transaction content in the trusted environment.

15. The system according to claim 14, the operations further comprising:

encrypting, by the blockchain node, a transaction execution result in the trusted environment; and sending, by the blockchain node, the encrypted transaction execution result to the transaction initiator, wherein the transaction initiator decrypts the encrypted transaction execution result.

16. The system according to claim 14, wherein the plaintext transaction content is related to a smart contract, and executing, by the blockchain node, the plaintext transaction content in the trusted environment comprises executing, by the blockchain node, the smart contract corresponding to the plaintext transaction content in the trusted environment, and the operations further comprise:

encrypting, by the blockchain node, at least one contract status corresponding to the smart contract in the trusted environment; and writing an obtained encrypted contract status into a database.

17. A non-transitory, computer-readable medium storing one or more instructions executable by a computer system to perform operations comprising:

receiving, by a blockchain node, a first privacy transaction, and determining, by the blockchain node, a first data volume of the first privacy transaction;

determining, by the blockchain node, a first summation value by adding the first data volume of the first privacy transaction to a first data volume of all privacy transactions in a buffer queue;

in response to determining, by the blockchain node, that the first summation value is not greater than a predetermined threshold, adding the first privacy transaction to the buffer queue;

receiving, by the blockchain node, a second privacy transaction, and determining, by the blockchain node, a second data volume of the second privacy transaction;

determining, by the blockchain node, a second summation value by adding the second data volume of the second privacy transaction to a second data volume of all privacy transactions in the buffer queue;

in response to determining, by the blockchain node, that the second summation value is greater than the predetermined threshold, packaging, by the blockchain node, all privacy transactions in the buffer queue and transferring the packaged privacy transactions into a trusted environment; and adding the second privacy transaction to the buffer queue.

18. The computer-readable medium according claim 17, the operations further comprising:

recording, by the blockchain node, a waiting duration of a given privacy transaction, the given privacy transaction having been added first to the buffer queue; and in response to the waiting duration reaching a predetermined duration, packaging, by the blockchain node, all privacy transactions in the buffer queue for transfer into the trusted environment.

19. The computer-readable medium according to claim 17, the operations further comprising:

in response to receiving a plaintext transaction, packaging, by the blockchain node, all privacy transactions in the buffer queue for transfer into the trusted environment; and executing, by the blockchain node, the plaintext transaction outside of the trusted environment.

20. The computer-readable medium according claim 17, wherein transaction content of a given privacy transaction is encrypted by a transaction initiator, the operations further comprising:

decrypting, by the blockchain node, the given privacy transaction in the trusted environment to obtain plaintext transaction content; and executing, by the blockchain node, the plaintext transaction content in the trusted environment.

\* \* \* \* \*

UNITED STATES PATENT AND TRADEMARK OFFICE
CERTIFICATE OF CORRECTION

PATENT NO. : 10,762,228 B2  
APPLICATION NO. : 16/788247  
DATED : September 1, 2020  
INVENTOR(S) : Qi Liu and Ying Yan Page 1 of 1

It is certified that error appears in the above-identified patent and that said Letters Patent is hereby corrected as shown below:

In the Claims

Column 15/Line 64 – In Claim 2, after "according" insert -- to --.

Column 17/Line 15 (Approx.) – In Claim 10, after "according" insert -- to --.

Column 18/Line 36 (Approx.) – In Claim 18, after "according" insert -- to --.

Column 18/Line 45 (Approx.) – In Claim 19, after "according" insert -- to --.

Column 18/Line 53 (Approx.) – In Claim 20, after "according" insert -- to --.

Signed and Sealed this  
Seventeenth Day of November, 2020

Andrei Iancu  
*Director of the United States Patent and Trademark Office*